(12) United States Patent
Kelley et al.

(10) Patent No.: US 8,170,192 B2
(45) Date of Patent: May 1, 2012

(54) PERSONALIZED CONFERENCE CALL SYSTEM AND METHOD

(75) Inventors: Edward E. Kelley, Wappingers Falls, NY (US); Wayne M. Delia, Poughkeepsie, NY (US); Tijs I. Wilbrink, En Leiden (NL)

(73) Assignee: International Business Machines Corporation, Armonk, NY (US)

( * ) Notice: Subject to any disclaimer, the term of this patent is extended or adjusted under 35 U.S.C. 154(b) by 1795 days.

(21) Appl. No.: 11/306,666

(22) Filed: Jan. 6, 2006

(65) Prior Publication Data

US 2008/0013706 A1    Jan. 17, 2008

(51) Int. Cl.
*H04M 3/42* (2006.01)
*H04L 12/16* (2006.01)
*H04Q 11/00* (2006.01)

(52) U.S. Cl. .................................................. 379/202.01

(58) Field of Classification Search .............. 379/202.01–205.01; 370/260–262
See application file for complete search history.

(56) References Cited

U.S. PATENT DOCUMENTS

| | | | |
|---|---|---|---|
| 6,310,947 B1 * | 10/2001 | Polcyn | 379/211.02 |
| 6,978,002 B1 * | 12/2005 | Cope et al. | 379/202.01 |
| 2004/0029567 A1 | 2/2004 | Timmins et al. | |
| 2004/0210637 A1 | 10/2004 | Loveland | |
| 2005/0018827 A1 | 1/2005 | Himmel et al. | |
| 2005/0094794 A1 * | 5/2005 | Creamer et al. | 379/202.01 |
| 2005/0227680 A1 * | 10/2005 | Snowden | 455/416 |

* cited by examiner

*Primary Examiner* — Ahmad Matar
*Assistant Examiner* — Nafiz E Hoque
(74) *Attorney, Agent, or Firm* — Whitham, Curtis, Christofferson & Cook, P.C.; Ronald A. Kaschak

(57) ABSTRACT

An enhancement for an electronic calendar provides a single call-in number and, preferably a pass code established for a user/participant in any and all conference call(s) in which use of the invention is authorized by an owner/caller initiating a conference call. The call-in number accesses the computer corresponding to the user/participant and is redirected to the conference call using information which is stored in memory separate from the electronic calendar and thus not accessible therefrom.

21 Claims, 4 Drawing Sheets

| Users phone number | Conference phone number | Personalized phone number | Userid | Passcodes |
|---|---|---|---|---|
| 567-895-8597 | 895-895-6678 | 567-896-5561 | Joe@us.ibm.com | 03349897676 |
| | | | | |
| | | | | |

*Figure 3*

PERSONALIZED CONFERENCE CALL SYSTEM AND METHOD

BACKGROUND OF THE INVENTION

1. Field of the Invention

The present invention generally relates to telephone services supporting conference calls and, more particularly, to arrangements for improving convenience of joining conference calls to leaders/owners and participants thereof.

2. Description of the Prior Art

Meetings of groups of individuals is considered essential to decision making in many business and other circumstances and generally are much more expeditious than negotiating through correspondence, including electronic messaging. In the past, meetings were usually conducted in person although finding a convenient time and place for all desired participants often proved difficult, even when meetings were relatively infrequent and the number of groups with whom an individual might meet were relatively few. However, at the present time, the need to conduct increasing numbers of meetings with more numerous groups has led to the increasing popularity of virtual meetings through so-called conference calls over the telephone. Such conference calls have become increasingly sophisticated, often including video images of participants and/or illustrations of material presented and discussed. Such meetings are also often used for educational purposes as well as business purposes such as seminars, professional continuing education courses and the like.

However, conference call services must be applied for and set up in advance and call-in numbers and pass codes unique to each conference call owner or caller (i.e. the person or entity who establishes the conference call and the call-in number and pass code are common to all conference calls established by that person or entity) are sent out and forwarded to the intended participants in the conference call; requiring numerous communications and the retention of the call-in number and pass code information, often for extended periods of time before the conference call actually takes place and which may be subject to error for that reason.

The possibility of error and the effort required to retain call-in numbers has been somewhat ameliorated by the increased usage of electronic mail and certain computer programs such as electronic calendars such that a single e-mail including conference call schedule, call-in number and pass code can be sent to an entire group of desired conference call participants (who can then individually indicate whether or not they will participate in the conference call) and thus transfer the conference call information (e.g. the call-in number and pass code) to their respective electronic (or paper) calendars. However, even this procedure is not entirely convenient since a person participating in the call will need to keep the electronic (or paper) calendar open at the time of joining the conference call to access the call-in and pass code information which interferes with access to information which may be needed for the meeting. This problem is often exacerbated by the practice of operators providing in-country dial-in numbers (and pass codes) in order to save costs for users but which essentially require a conference call to join yet another conference call. The time required to do so may also be a problem when conference calls are tightly scheduled. The retention of the call-in number and pass code in the calendar of an intended participant also compromises security of the conference call since it is the nature of electronic calendar arrangements to allow access generally to other computers or terminals connected to the network in order to convey information about unscheduled periods of time in a user's agenda.

SUMMARY OF THE INVENTION

It is therefore an object of the present invention to provide a personalized call-in number and automated common protocol to provide the convenience to a user of a single and simplified protocol common to all conference calls in which a given user may participate and to provide enhanced security for conference calls and the information required to join particular conference calls.

In order to accomplish these and other objects of the invention, a method and apparatus providing a computer program are provided for performing steps of personalized conference call method comprising steps of assigning a unique telephone number to a user, accepting an invitation to participate in a conference call delivered through an electronic calendar on a terminal, storing a call-in number unique to a conference call owner upon acceptance of the invitation, calling the unique telephone number, and redirecting a call initiated by the calling step to the call-in number.

BRIEF DESCRIPTION OF THE DRAWINGS

The foregoing and other objects, aspects and advantages will be better understood from the following detailed description of a preferred embodiment of the invention with reference to the drawings, in which:

FIG. 3 is an exemplary table for providing call-in redirection in accordance with the invention.

DETAILED DESCRIPTION OF A PREFERRED EMBODIMENT OF THE INVENTION

Figure 1:
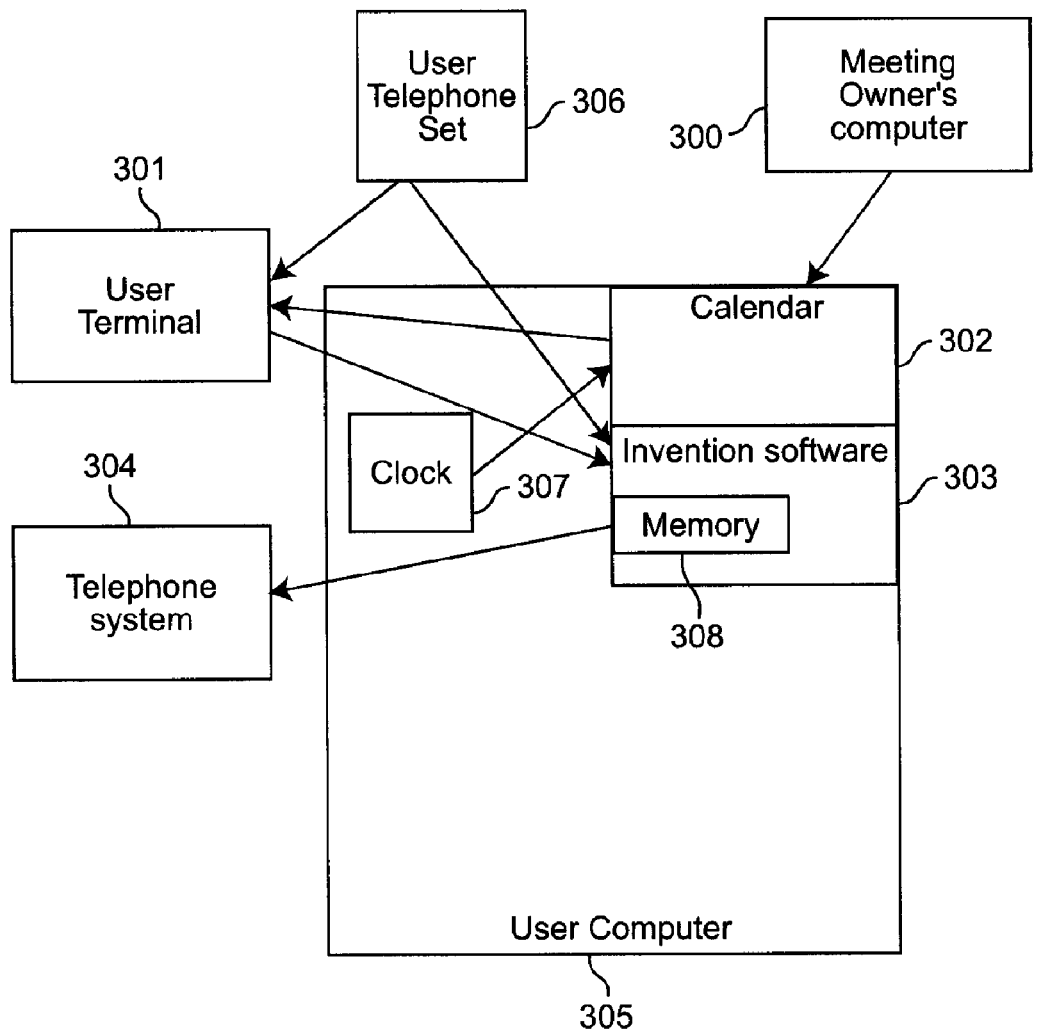
FIG. 1 is a schematic block diagram of the invention.

Referring now to the drawings, and more particularly to FIG. 1, there is shown a high-level block diagram of a preferred implementation of the invention. Those skilled in the art will recognize that FIG. 1 can also be understood as a diagram of data or control command flow during operation of the invention. It is also assumed for purposes of discussion of FIG. 1 and conveying a more general understanding of the invention that the user's computer or terminal 301 is connected to at least a local or wide area network (LAN or WAN, respectively) and that user computer 305 as depicted corresponds to a server therefor. However, this need not be the case and the invention can be conveniently implemented in connection with a stand-alone system (in which case, user terminal 301 and user computer 305 would be combined) or in a network in which user computer 305 is implemented on a network node which may be separated from the user terminal 301 by several intervening network nodes or even at a node of the telephone system generally depicted at 304 of FIG. 1.

As alluded to above, it is preferred and assumed for purposes of discussion that user computer 305 has calendar software, firmware or hardware 302 for performing at least standard calendar functions resident thereon. Such standard calendar functions almost universally include but are not limited to receiving information regarding requested appointments from any terminal or computer connected to the network (represented in FIG. 1 by the meeting owner computer or terminal 300), providing an opportunity to accept or reject the requested appointment or propose a different time and providing notification to the user when the appointment time is approached and is reached. That is, the meeting owner computer 300 communicates directly with the calendar software 302 for purposes of scheduling a meeting and can cause the calendar software of a plurality of users to be searched for determining a time which is potentially available to all desired conference call participants in common.

The invention is preferably implemented with software 303 which is preferably embodied as an enhancement of the calendar software 302 which communicates with the conference call software of the invention as will be discussed in greater detail below. The calendar software 302 is responsive to computer clock 307 to produce messages to the user both on-demand and automatically at certain intervals at and prior to a scheduled appointment time. The conference call arrangement 303 in accordance with the invention, preferably embodied in software, includes commands for establishing corresponding memory space 308 in addition to that established by calendar software 302 to which call information has been communicated from the meeting owner's computer 300 when scheduling the call for purposes of holding conference call owner UserID, call-in and pass code information for each conference call in association with a particular scheduled time for each conference call on the user's agenda.

At the scheduled time of a conference call, the information stored in memory 308 is used to determine authorization to use the invention and provide redirection of a call from user telephone set 306, made either directly from the user's telephone set 306 or through user terminal 301 in the case of so-called voice over internet protocol (VoIP). Thus, when calendar 302 transmits a message to user terminal 301 at the scheduled time of a conference call, the user may, in effect, join the conference call by calling computer 305 for which a single personalized number and, preferably a pass code associated with and preferably unique to each user has been established and the conference call software of the invention will then use information in memory 308, as specified by calendar 302, to call the number established for the particular conference call owner and provide the associated pass code to make the connection to telephone system 304 and provide the pass code in order for the user to join the conference call. Thus, the user need only use a single personalized telephone number unique to that user (which could also be automated from user terminal 301) and, preferably, a single pass code at any time any conference call is to be joined, regardless of the telephone number and pass code established for that particular conference call owner. This arrangement in accordance with the invention provides not only substantial convenience to the user since the user need not know or retrieve from calendar 302 (or a paper calendar) the particular information needed for joining a particular conference call and which need not even be provided to a user from calendar 302 or even available in the calendar (to which other users have access) but also substantial security enhancement for the conference call itself, as will be discussed in greater detail below.

Figure 2A:
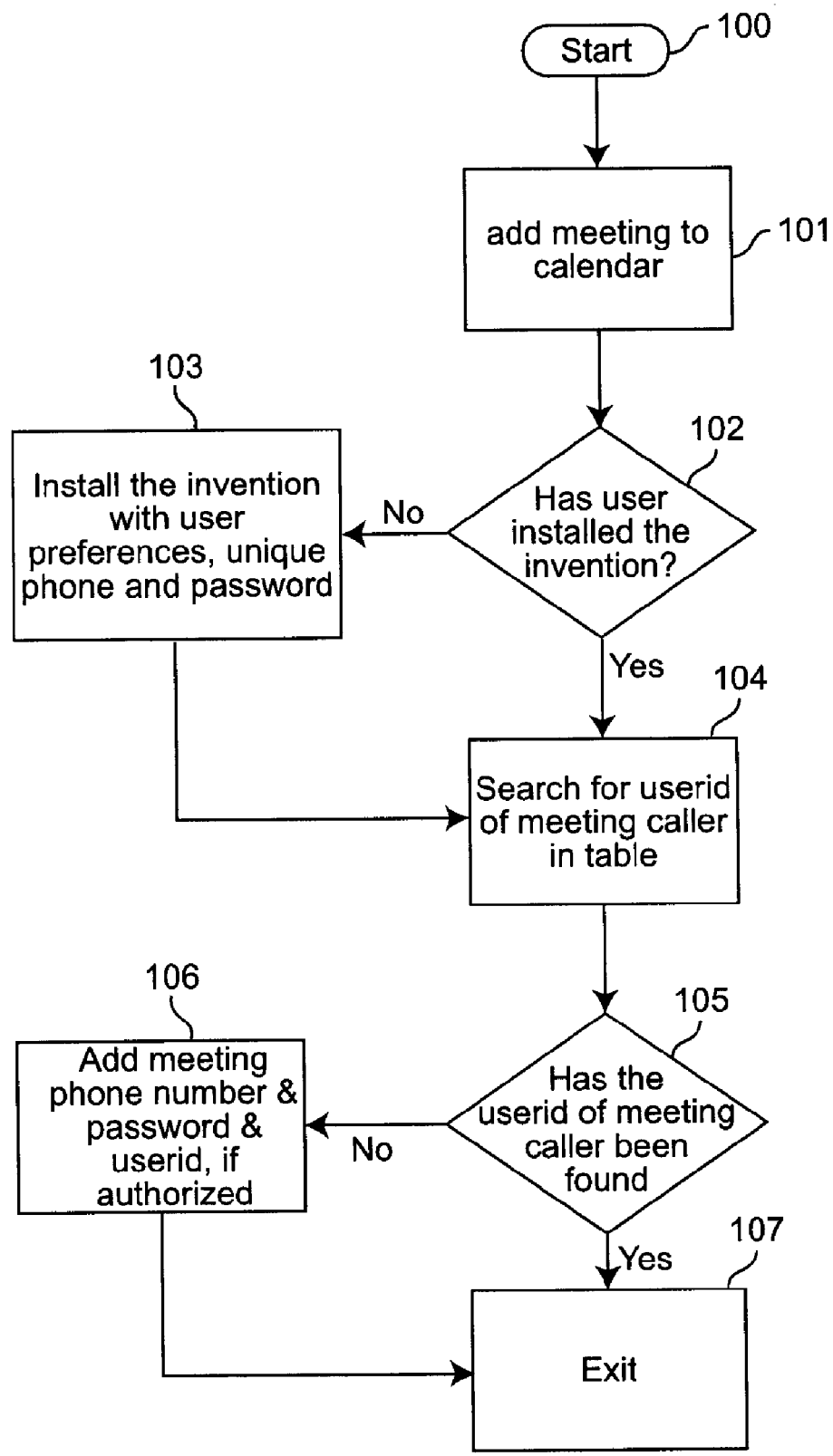
FIGS. 2A and 2B together form a flow chart illustrating operation of a preferred form of the invention.
Figure 2B:
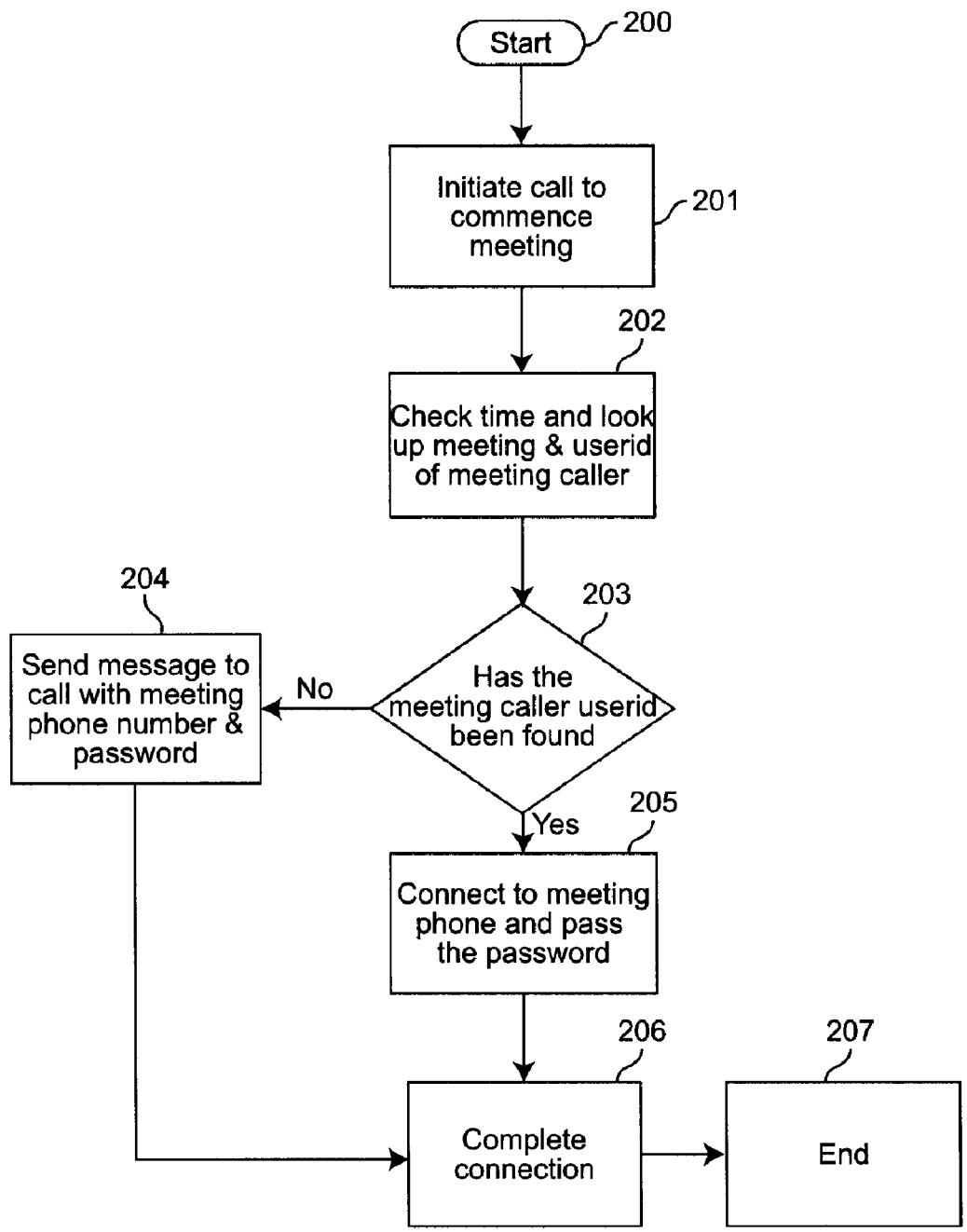

Referring now to FIGS. 2A and 2B which depict two separate phases of operation of a preferred form of the invention, the operation of the invention will now be discussed. As will be appreciated by those skilled in the art, implementations of the invention preferably include operations by which it can be controlled and that some of the operations may be modified to enhance operation in particular circumstances.

Once the invention has been installed on at least one of computers 300 and 301, preferably in connection with calendar software, the operation of the invention is invoked 100 by a request for a virtual meeting by conference call from the meeting owner's computer 300. In general, the request will be in the form of an invitation to participate in the virtual meeting which, when conveyed to the user from the calendar 302 through user terminal 301, the user may accept for addition (101) to the user's calendar or decline and, preferably, under control of the conference call owner, concurrently be allowed to accept use of a personalized call-in number and common protocol in accordance with the invention for purposes of joining that particular conference call. If the user accepts, the conference call is added to the calendar as indicated at 101 and the process continues with a determination 102 of whether or not the user has installed the invention. If not, the invention may, upon authorization by the user/participant through a menu, dialog box or the like, preferably be downloaded from the meeting owner computer 300 and installed with user preferences (e.g. mute/unmute, roll call and/or log-in identification or participant entry/departure notifications) and the unique personalized call-in number and pass code for that user as the user specifies, as illustrated at 103. The user will presumably know the telephone number by which his computer can be reached and can supply any desired pass code for authenticating the user to the computer and the conference call application of the invention.

If the invention is installed or after it is installed at step 103, the operation of the invention continues with the next operation of the invention at 104 to search for the UserID of the meeting caller/owner in a table (embodied as memory 308, discussed above) such as that of FIG. 3 which will be discussed below. As noted above, a call-in number and pass code is established for each conference call owner and will be used for all conference calls established by that individual or entity. Thus, it is preferable to retain such a UserID and associated call-in number and pass code even after the conference call is conducted and terminated since its presence in the memory of the conference call arrangement of the invention serves to indicate permission of that conference call owner to use the invention. The use of a table is preferred not only for accommodating a plurality of scheduled conference calls and conference call owners but also a plurality of users of a particular user terminal or conference call owner terminal. If the conference call, owner (sometimes referred to as a caller or owner/caller hereinafter) is not found in the table, caller UserID, the call-in number and pass code for the conference call owner are entered into the table including memory 308. It will be recalled that it is assumed, for purposes of this discussion, that the invention is installed on at least one of computers 300, 301 in order to invoke its operation. Thus, if the invention is installed on the computer 300 of the conference call owner, it is also assumed that the conference call owner has authorized the use of the invention by the user/participant to join the conference call using a consistent protocol for all conference calls regardless of the owner/caller or whether the conference call must be joined in the conventional manner.

It is also considered desirable to provide for installation of the invention on the conference call owner computer to be masked from the user/participant computer 301 by any of a variety of suitable techniques which will be evident to those skilled in the art to allow suppression of the use of the invention at the will of the conference call owner for particular user(s)/participant(s). On the other hand, if the invention is initially installed only on computer 301 of the user/participant, a request for permission to use the invention for joining the conference call can be requested from computer 301 to computer 300 and installation conducted on computer 300 from computer 301, if authorized by the owner/caller. The request may also allude to the enhancement of security in accordance with the invention. It should be understood and appreciated that even if the invention is not installed on computer 300 or its installation masked and installation is not authorized, the conference call scheduling may proceed in the known manner using the call-in number and pass code established for the owner/caller for conference calls and communicated to the user/participant in the conventional manner through the existing calendar arrangement.

This transfer of the conference call information from the calendar to the conference call arrangement of the invention serves to prevent the call information from being accessed from the calendar with which other terminals may freely communicate and, although it requires communication of the UserID of the owner/caller protects both that information and the call-in and pass code information from being accessed through the calendar. That is, while the owner/caller may wish to avoid the communication of a UserID, doing so does not compromise the security of it since it is preferably not accessible from memory 308 and such communication allows and supports enhancement of security of other information allowing joining of the conference call. In any event, a surrogate UserID could be used for such purposes in the practice of the invention to avoid transmission of a UserID having other security/authorization functions. The step of searching for the UserID also serves to prevent duplicate entries in the table and to facilitate changes in the scheduling of a given conference call. The first phase of operation of the invention then exits regardless of whether or not step 105 branched to 106 to add information to the table 308.

Referring now to FIG. 2B, the second phase of operation begins (200) as the scheduled conference call time is approached. The conference call user/participant initiates a call using the personalized and consistent call-in number and, preferably, pass code in accordance with the invention to commence the meeting as illustrated at 201. This may be done manually, possibly in response to a reminder from the calendar arrangement at the meeting owner's computer 300, or automatically by the implementation of the invention on the meeting owner computer in response to an entry in the calendar arrangement running thereon. The remainder of the operations depicted in FIG. 2B are internal to the invention and, preferably, completely transparent to the user/participant. Concurrently, at the user's computer, the time is checked in regard to a scheduled conference call and the memory 308 is searched for the UserID of the owner/caller entered therein for that conference call, as illustrated at 202. If a UserID corresponding to the conference call is found, as determined at 203, the associated call-in number and pass code are retrieved and used to connect to the meeting at step 205 and the connection, thus redirected to the call-in number of the owner/caller, is completed at 206, whereupon, the function of the invention is completed and the operation may exit at 207. If the UserID or surrogate UserID is not found (indicating that use of a common protocol for joining the conference call has not bee authorized by the owner/caller), the process branches to send a message to the user/participant that the conference call must be joined in the conventional manner and providing the call-in number and pass code from memory 308 or the memory of the calendar in order to do so The connection to the conference call can then be completed in the conventional manner 206 and the process exits 207.

It should be appreciated in this regard that the invention can be used to provide enhanced security for such information regardless of whether or not use of a common protocol is authorized and the convenience of the invention otherwise available is utilized. That is, at step 106, described above, the call-in number and pass code for a conference call can be transferred from the calendar arrangement memory to memory 308 of the invention from which they are preferably inaccessible with or without selective inclusion or storage of a UserID or surrogate UserID in accordance with an authorization to do so or lack thereof.

Thus it is seen that the invention provides for user control of use of a common protocol and a number unique to a user but common all conference calls on the agenda of that user to expedite and simplify joining scheduled conference calls or virtual meetings but also allows use of conventional call-in and pass code numbers as well, if desired by the user. The invention also provides improved security for the conference call since the call-in number and pass code for a particular call need not ever be displayed to a user. The call-in number for the user's computer and used to redirect the call is presumably known only to the user and the user is preferably authenticated to the terminal and calendar, as well, in accordance with the user ID maintained in the table of FIG. 3. The user's telephone number and the personalized phone number used in operation of the invention also contained in the table of FIG. 3 may also be checked for further user authentication and it is preferred that only calls from a particular telephone which the user would use for a conference call from while the user was located at a particular terminal would be accepted by the invention for purposes of reading out the conference phone number and the pass code While the invention has been described in terms of a single preferred embodiment, those skilled in the art will recognize that the invention can be practiced with modification within the spirit and scope of the appended claims.

What is claimed is:

1. A personalized conference call method comprising steps of
assigning a unique telephone number for making a connection from a telephone device of a user to a computer terminal,
accepting an invitation to participate in a conference call, said invitation and said step of accepting being communicated through an electronic calendar on said computer terminal,
storing a call-in number unique to a conference call owner at said computer terminal upon acceptance of said invitation,
calling said unique telephone number, and
redirecting a call initiated by said calling step to said call-in number for a conference call for which an invitation has been accepted in said accepting step.

2. The method as recited in claim 1 wherein said step of storing a call-in number includes storing of a pass code.

3. The method as recited in claim 2 wherein said step of storing said call-in number includes the further step of selectively storing a UserID of a owner/caller of a conference call.

4. The method as recited in claim 1 including the further step of installing a computer program on a computer corresponding to said owner/caller or a user/participant.

5. The method as recited in claim 4, wherein said step of installing a computer program includes storage of a call-in number corresponding to a computer of said user/participant.

6. The method as recited in claim 5, wherein said step of installing a computer program installs said computer program as an enhancement of an electronic calendar on a computer.

7. The method as recited in claim 6, wherein, upon acceptance of said invitation, information regarding said conference call are stored in said electronic calendar.

8. The method as recited in claim 7, including the further step of transferring a call-in number and pass code of said owner/caller contained in said conference call information from said electronic calendar to a separate memory established by said computer program.

9. Apparatus comprising a non-transitory computer-readable storage medium providing signals comprising a program for a computer; which program, when run on a computer, causes the computer to perform steps of
- assigning a unique telephone number for making a connection from a telephone device of said user to a computer terminal,
- processing acceptance of an invitation to participate in a conference call, said invitation and said acceptance being communicated through an electronic calendar on said computer terminal,
- storing a call-in number unique to a conference call owner at said computer terminal upon acceptance of said invitation,
- receiving a call to said unique telephone number, and
- redirecting a call initiated by said calling step to said call-in number for a conference call for which an invitation has been accepted in said accepting step.

10. The apparatus as recited in claim 9 wherein said step of storing a call-in number includes storing of a pass code.

11. The apparatus as recited in claim 10 wherein said step of storing said call-in number includes the further step of selectively storing a UserID of a owner/caller of a conference call.

12. The apparatus as recited in claim 9 including the further step of installing a computer program on a computer corresponding to said owner/caller or a user/participant.

13. The apparatus as recited in claim 12, wherein said step of installing a computer program includes storage of a call-in number corresponding to a computer of said user/participant.

14. The apparatus as recited in claim 12, wherein said step of installing a computer program installs said computer program as an enhancement of an electronic calendar on a computer.

15. The apparatus as recited in claim 14, wherein, upon acceptance of said invitation, information regarding said conference call are stored in said electronic calendar.

16. The apparatus as recited in claim 15, including the further step of transferring a call-in number and pass code of said owner/caller contained in said conference call information from said electronic calendar to a separate memory established by said computer program.

17. A computer-implemented personalized conference call method comprising steps of
- configuring said computer as an apparatus for assigning a unique telephone number for connection of a telephone device of a user to a computer terminal,
- configuring said computer as an apparatus for storing a call-in number unique to a conference call owner at said computer terminal upon acceptance of an invitation, said invitation and said acceptance being communicated through an electronic calendar on said computer terminal, to participate in a conference call,
- configuring said computer as an apparatus for accepting a call from a telephone device to said unique telephone number, and
- configuring said computer as an apparatus for redirecting a call initiated by said calling step to said call-in number for a conference call for which an invitation has been accepted in said accepting step.

18. The method as recited in claim 17 wherein said step of storing a call-in number includes storing of a pass code.

19. The method as recited in claim 18 wherein said step of storing said call-in number includes the further step of selectively storing a UserID of a owner/caller of a conference call.

20. The method as recited in claim 17 including the further step of installing a computer program on a computer corresponding to said owner/caller or a user/participant.

21. A personalized conference call method comprising steps of
- assigning a unique telephone number to a user for connection of a telephone device to a computer terminal,
- accepting an invitation to participate in a conference call communicated through an electronic calendar on said computer terminal,
- storing a call-in number unique to a conference call owner at said computer terminal upon acceptance of said invitation,
- calling said unique telephone number, and
- redirecting a call initiated by said calling step to said call-in number for a conference call for which an invitation has been accepted in said accepting step.

* * * * *